US006070929A

United States Patent [19]

Barkley

[11] Patent Number: 6,070,929

[45] Date of Patent: Jun. 6, 2000

[54] DECK LID LINKAGE DRIVE

[75] Inventor: Robert D. Barkley, Nepean, Canada

[73] Assignee: M & C Corporation, Warren, Mich.

[21] Appl. No.: 08/932,064

[22] Filed: Sep. 15, 1997

[51] Int. Cl.[7] .......... B62D 25/10

[52] U.S. Cl. .......... 296/76; 16/75; 49/386

[58] Field of Search .......... 296/76; 49/386; 16/25

[56] References Cited

U.S. PATENT DOCUMENTS

| | | | |
|---|---|---|---|
| 2,871,505 | 2/1959 | Clark et al. | 296/76 |
| 2,894,277 | 7/1959 | Bogater et al. . | |
| 3,085,286 | 4/1963 | Whitehouse et al. . | |
| 3,166,783 | 1/1965 | Mackie et al. . | |
| 3,171,156 | 3/1965 | Peras . | |
| 3,402,508 | 9/1968 | Kessler | 49/386 |
| 3,438,152 | 4/1969 | Cadiou | 16/75 |
| 3,476,375 | 11/1969 | Brasseur | 296/76 |
| 3,695,678 | 10/1972 | George | 296/76 |
| 4,206,944 | 6/1980 | Kumagal et al. | 296/76 |
| 4,291,501 | 9/1981 | Steinberg et al. | 49/386 |
| 4,415,194 | 11/1983 | Bauer | 296/76 |
| 4,706,334 | 11/1987 | Beckwith . | |
| 5,136,811 | 8/1992 | Lyons, Sr. | 49/386 |
| 5,301,469 | 4/1994 | Lyons, Sr. | 49/386 |
| 5,373,665 | 12/1994 | Lyons, Sr. | 49/386 |
| 5,746,468 | 5/1998 | Schoen et al. | 296/76 |

FOREIGN PATENT DOCUMENTS

| | | | |
|---|---|---|---|
| 552687 | 4/1953 | Canada | 296/76 |
| 2605041 | 4/1988 | France | 16/75 |
| 384182 | 11/1923 | Germany | 296/76 |
| 581380 | 8/1958 | Italy | 296/76 |
| 0962567 | 9/1982 | U.S.S.R. | 16/75 |

*Primary Examiner*—Joseph D. Pape
*Assistant Examiner*—Kiran Patel
*Attorney, Agent, or Firm*—Brooks & Kushman P.C.

[57] ABSTRACT

A linkage drive assembly for assisting in opening a deck lid or hood of a vehicle is disclosed. The linkage drive assembly includes a pair of links. The links are pivotally connected together at one end so that they may fold and unfold. The upper link is connected at its opposite end to the deck lid or hood. The lower link is pivotally connected at its opposite end to a box. The box is mounted to a side of the vehicle. A torque rod having a stationary end and a crank end is provided. The stationary end is anchored to the box and the crank end is connected to the lower link. The torque rod twists in torsion and stores energy when the links fold and the deck lid or hood is closed. The torque rod untwists and releases energy causing the links to unfold and support the deck lid when the deck lid or hood is opened.

13 Claims, 3 Drawing Sheets

DECK LID LINKAGE DRIVE

TECHNICAL FIELD

The present invention relates generally to hinge and counterbalance assemblies for deck lids or hoods, and more particularly, to linkage drive assemblies which utilize torque rods and links to bias a deck lid or hood to an opened position.

BACKGROUND ART

A conventional deck lid of a vehicle is quite heavy. Usually, the deck lid is pivotally attached to a vehicle body using hinge strap assemblies and is typically spring biased towards an opened position. This biasing eases the burden on a vehicle operator in opening the deck lid.

A first or proximate end of a hinge strap is pivotally attached relative to the vehicle body. A second or distal end is affixed to the deck lid. With respect to hinge strap assemblies for deck lids, hinge boxes generally bolt beneath the back shelf and rear window of a vehicle. A pair of spaced apart ears on each hinge supports a pivot pin which extends through the proximate end of a respective hinge strap. These hinge boxes are relatively complex in configuration and rather expensive to manufacture.

Typically, biasing has been derived from one or more torque rods. Torque rods have been particularly widely used because they provide a biasing torque as a result of rotation of one end of the rod relative to the other. Thus, one end of a torque rod may be connected to the vehicle and the other end to a hinge strap attached between the vehicle and the deck lid to provide a biasing mechanism. When the deck lid closes, the end attached to the hinge strap moves through an arcing or curvilinear translational motion causing another portion of the torque rod to twist in torsion thereby storing energy. When the deck lid opens, the torque rod unwinds releasing energy and assisting in biasing the deck lid to an opened position.

Through appropriate selection of the torque rod diameter and length, a variety of deck lids of different weights and sizes may be appropriately biased with this method. Torque rods are also highly reliable, simple mechanical devices.

Several drawbacks exist with the above described hinge strap assemblies and their torque rods. First, torque rods which span transversely across the width of a vehicle occupy a significant amount of space in the trunk compartment. Second, hinge straps are usually designed to be placed apart from the side of the vehicle thereby intruding in the space within the interior portion of the trunk compartment to operate.

Another approach to biasing a deck lid pivotally attached to a vehicle is to use a linkage assembly powered by a gas strut. The linkage assembly typically includes a pair of links pivotally connected together at one end. One of the links is connected at its opposite end to the vehicle. The other one of the links is connected at its opposite end to the deck lid. The links fold when the deck lid is closed and unfold when the deck lid is opened. A gas strut operating with the linkage assembly biases the deck lid to the opened position. The gas strut applies pressure to the links to make them unfold and stay unfolded to support the deck lid when the deck lid is opened.

However, several drawbacks exist with using a gas strut. First gas struts are not reliable, especially in cold weather climates. Second, because of the unreliability, associated warranty costs increase.

There exists a need to use a linkage drive assembly without the disadvantages associated with a hinge strap assembly biased by a torque rod and a linkage assembly powered by a gas strut.

SUMMARY OF THE INVENTION

Accordingly, it is an object of the present invention to provide a linkage drive assembly having a pair of links powered by a torque rod for assisting in opening a deck lid.

It is another object of the present invention to provide a linkage drive assembly having a convoluted torque rod which is more compact in overall length than conventional torque rods.

It is still another object of the present invention to provide a linkage drive assembly having a convoluted torque rod with a plurality of bight portions and legs which increase the energy storing capability of the torque rod without adding to the overall length of the torque rod.

It is still yet another object of the present invention to provide a linkage drive assembly which minimizes the intrusion into the trunk compartment space.

It is yet still another object of the present invention to provide a linkage drive assembly which is aesthetically pleasing to the vehicle consumer.

It is yet still a further object of the present invention to provide a linkage drive assembly which is highly reliable.

In carrying out the above objects, the present invention provides a linkage drive for a deck lid pivotally attached to a vehicle. The linkage drive includes a lower link and an upper link. The upper link is attached at one end to the deck lid and pivotally connected at the other end to the lower link. A torque rod having a first end, a second end, and a convoluted portion extending therebetween is also provided. The convoluted portion includes at least two generally parallel legs and at least one U-shaped bight portion connected therebetween. The first end is anchored to the vehicle and the second end is anchored to the lower link. As the deck lid is closed, the links fold, twisting or winding-up the torque rod to increase the tension therein. When the deck lid is raised, the links unfold and the tension in the torque rod relaxes somewhat to assist in the raising action, and the residual tension in the torque rod when the lid is fully open, holds the lid open. A hinge box or bracket mounted to a side of the vehicle may be used to anchor the first end of the torque rod to the vehicle.

In accordance with the linkage drive, a linkage drive assembly for a deck lid or hood is also provided. The linkage drive assembly includes a box for attachment to a vehicle quarter panel. A torque rod having a first end, a second end, and a convoluted portion extending therebetween is also provided. The convoluted portion includes at least two generally parallel legs and at least one U-shaped bight portion connected therebetween. The first end is anchored to the box. A lower link having a lower portion connected to the second end of the torque rod and an upper portion is also provided. An upper link having a lower portion pivotally connected to the upper portion of the lower link and an upper portion for attachment to the deck lid or hood is further provided.

The advantages accruing to the present invention are numerous. The degree of intrusion in the trunk compartment is minimized with the use of a pair of links extending between the deck lid and the side of the vehicle powered by a convoluted torque rod. The convoluted torque rod extends toward the side of the vehicle and away from the interior of the trunk compartment to minimize the intrusion. Furthermore, the use of a torque rod increases the reliability of the present invention when compared with prior art systems that rely on gas struts.

These and other features, aspects, and embodiments of the present invention will become better understood with regard to the following description, appended claims, and accompanying drawings.

BEST MODES FOR CARRYING OUT THE INVENTION

Figure 1:
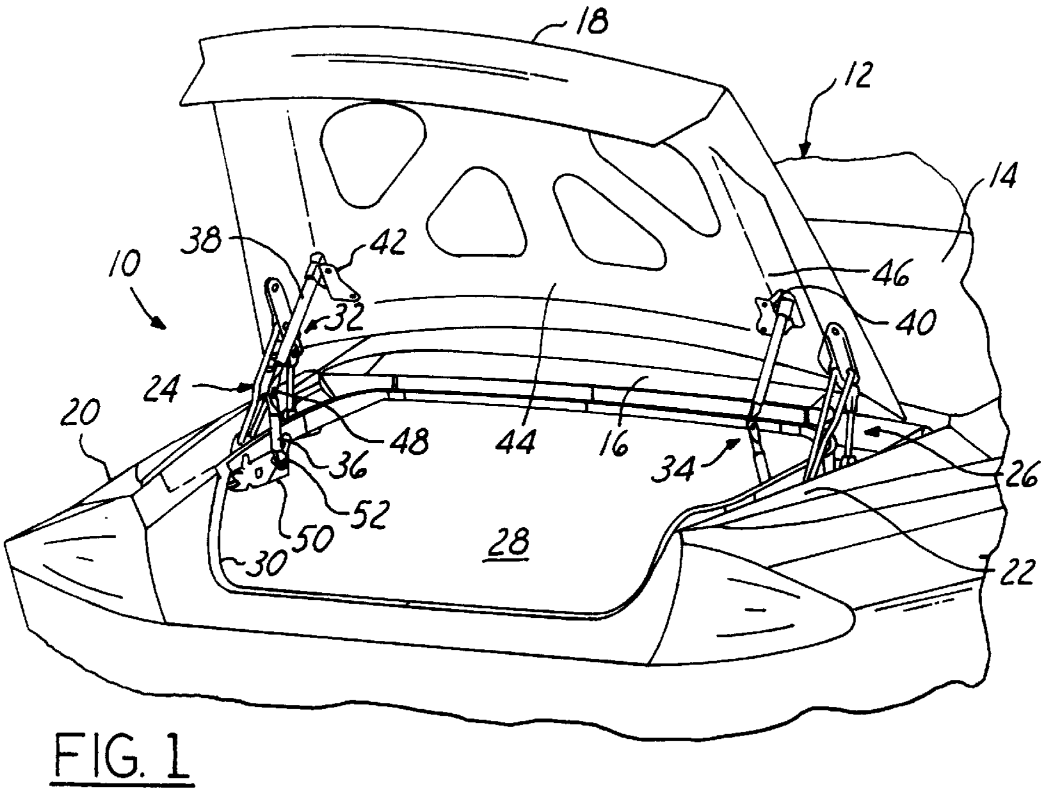
FIG. 1 is a perspective rear view of a vehicle having a linkage drive assembly of the present invention and a deck lid pivotally attached to the vehicle.

Referring now to FIG. 1, a linkage drive assembly 10 for a vehicle 12 is shown. Vehicle 12 has a rear window 14 disposed above a generally horizontally extending backshelf 16. Vehicle 12 includes a deck lid 18 pivotally attached to quarter panels, or sides, 20 and 22 of vehicle 12 through respective hinge assemblies 24 and 26. Hinge assemblies 24 and 26 support deck lid 18 for swingable movement between opened and closed positions over trunk compartment 28 and deck lid opening 30.

Figure 5:
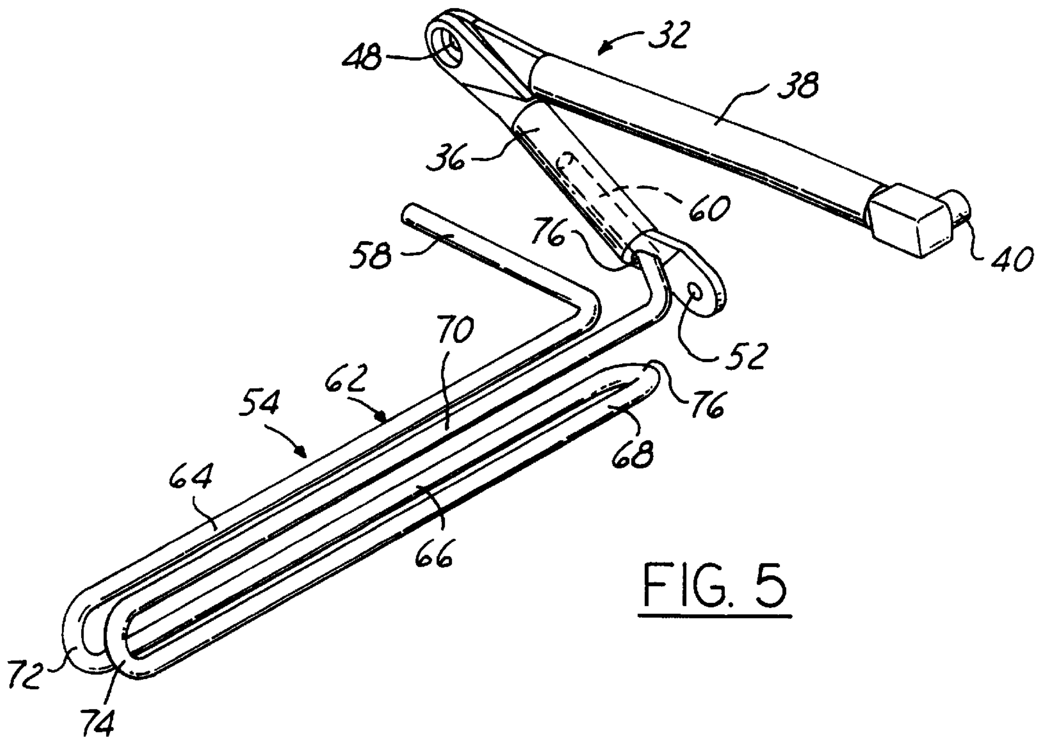
FIG. 5 is a perspective view of the folded linkage drive assembly shown in FIG. 3 without the box and showing the end of the torque rod connected to the lower link in phantom.
Figure 6:
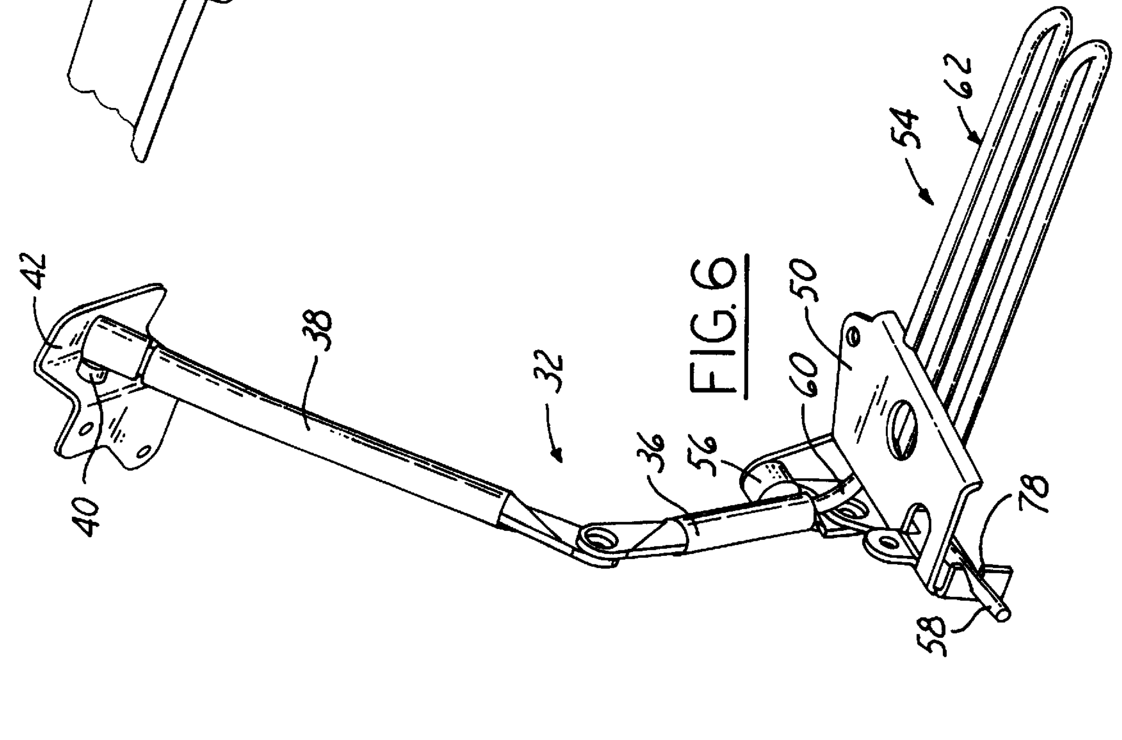
FIG. 6 is a perspective view of an unfolded linkage drive assembly having a ball joint and bracket attached to the upper link.
Figure 4:
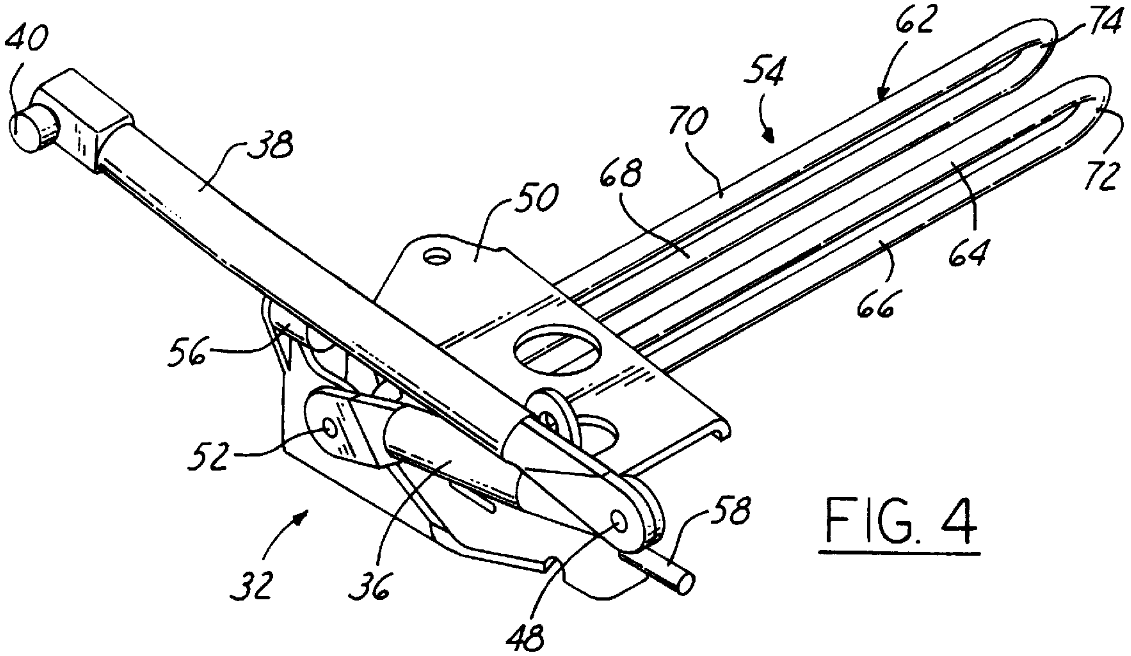
FIG. 4 is a perspective view of the folded linkage drive assembly shown in FIG. 3 rotated by 180 degrees.

Link assemblies 32 and 34 extend between deck lid 18 and both quarter panels 20 and 22 of vehicle 12. Each of link assemblies 32 and 34 have identical structure so only link assembly 32 will be discussed in greater detail. Link assembly 32 includes a lower link 36 and an upper link 38. As best shown in FIGS. 4, 5 and 6, upper link 38 preferably has a ball joint 40 attached to a bracket 42. Referring back to FIG. 1, bracket 42 is attached to a downwardly extending portion 44 and a laterally extending portion 46 of deck lid 18.

Ball joint 40 allows upper link 38 to be transversely rotatable to deck lid 18 to enable link assembly 32 to fold when deck lid 18 closes and unfold when the deck lid opens. Furthermore, ball joint 40 enables vertical and horizontal adjustment between linkage drive assembly 10 and deck lid 18. This allows the pivot axis of linkage drive assembly 10 to be moved accurately relative to deck lid 18 and vehicle 12. Of course, other types of attachments may be used which may or may not provide as much adjustment flexibility so long as links 36 and 38 can fold and unfold.

Lower link 36 is pivotally connected at one end to upper link 38, preferably by a riveted joint 48. The pivot connection enables links 36 and 38 to fold and unfold. Lower link 36 is pivotally connected at the other end to a hinge box or bracket 50, also preferably by a riveted joint 52. Hinge box 50 is fixedly mounted by bolts rivets or other suitable fastening to quarter panel 20 of vehicle 12.

Figure 2:
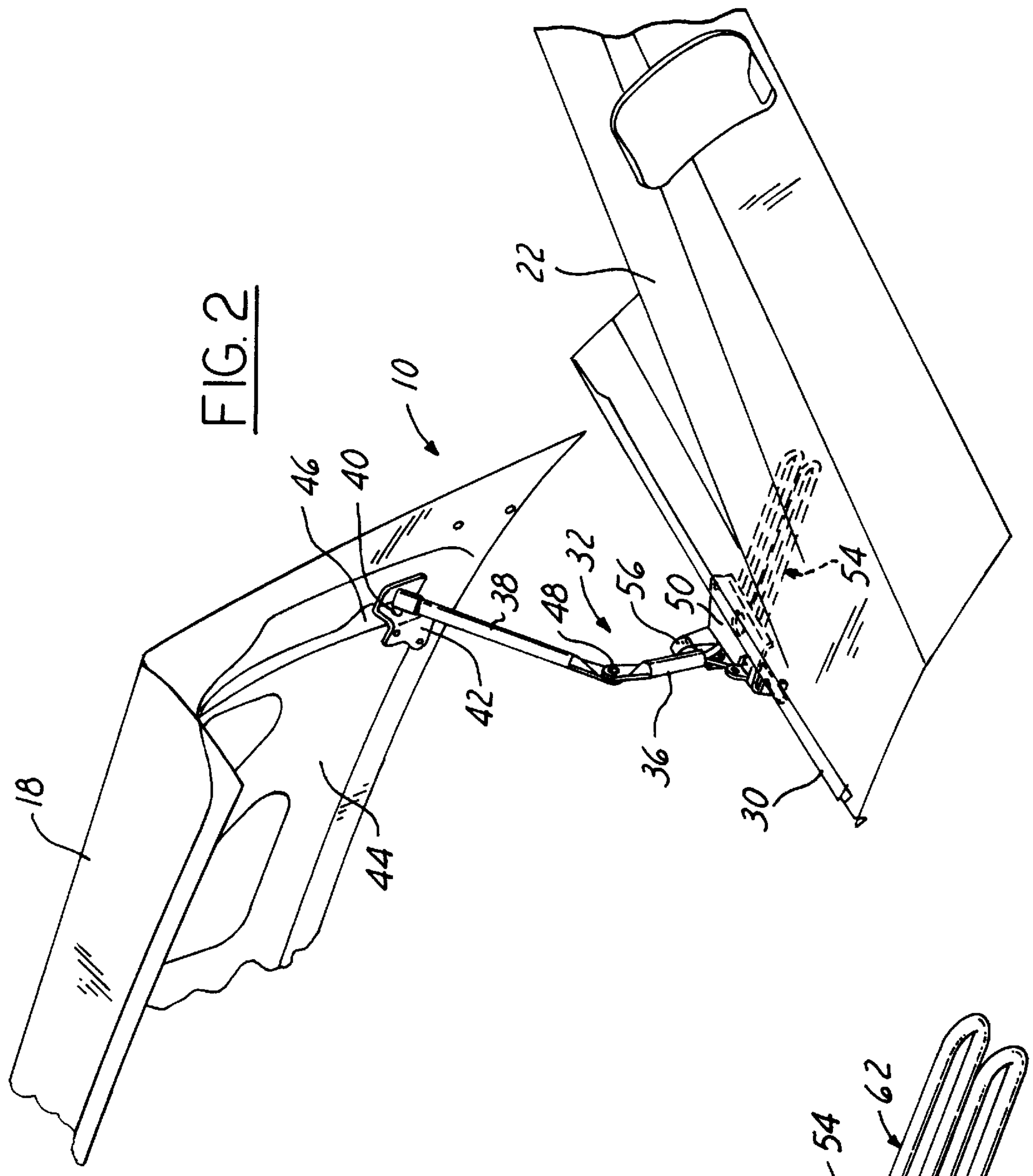
FIG. 2 is a side view of an unfolded linkage drive assembly extending between the deck lid and the vehicle and showing the torque rod in phantom.

Referring now to FIG. 2, a side view of link assembly 32 unfolded to hold deck lid 18 in the opened position is shown. A torque rod or spring 54 releases energy from unwinding tension when deck lid 18 is opened causing link assembly 32 to unfold. Torque rod 54 is windingly tensioned and stores energy when deck lid 18 is closed. Torque rod 54 is configured to be small enough that it can extend towards or be housed within the space defined by quarter panel 22 instead of extending towards or being disposed within the interior of trunk compartment 28. Accordingly, because link assembly 32 is mounted adjacent trunk lid opening 30 and torque rod 54 extends away from the interior of trunk compartment 28, the amount of intrusion in the trunk compartment is minimized.

An elastomeric bumper 56 is provided on box 50 to cushion the impact of lower link 36 thereon when deck lid 18 is opened. Bumper 56 also sets the opened position of deck lid 18 by limiting the amount that link assembly 32 unfolds and the arcuate range of motion of lower link 36 by engaging the lower link.

Figure 3:
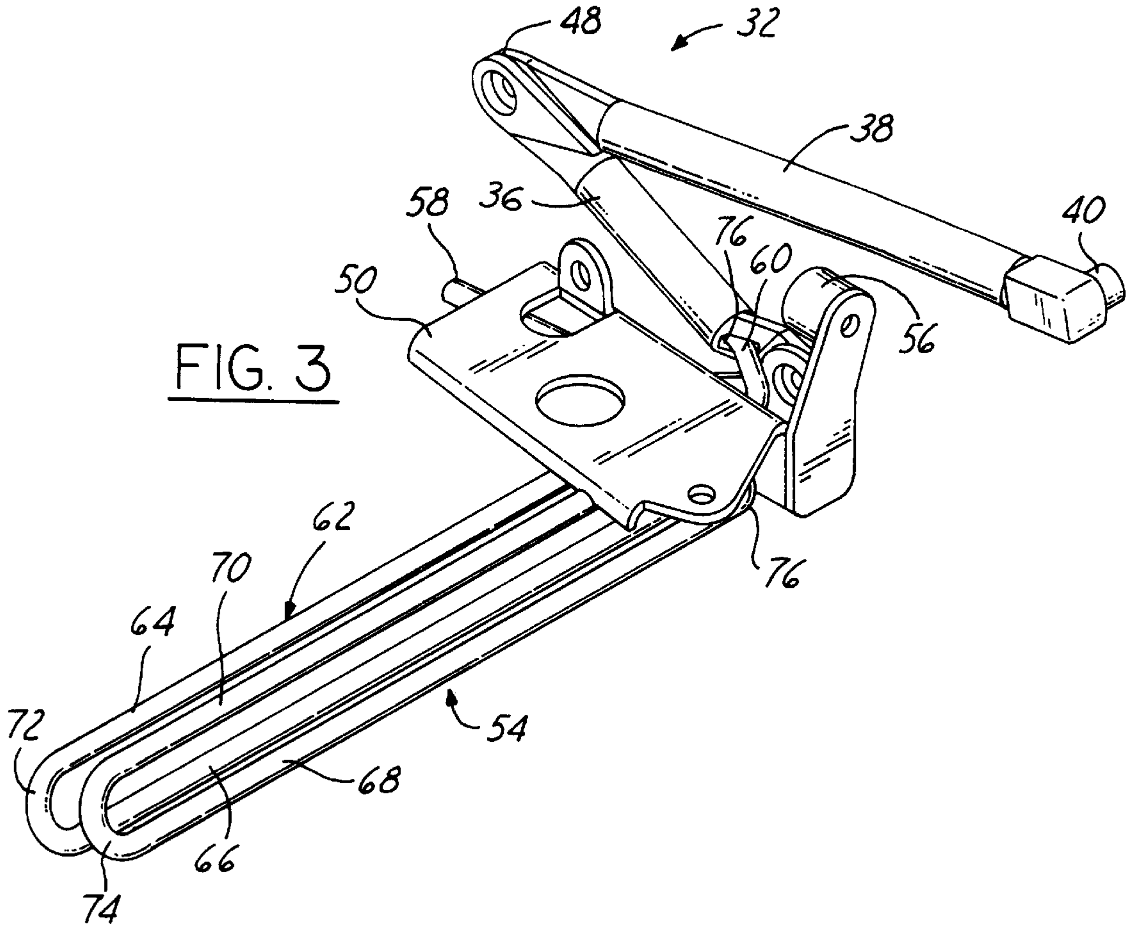
FIG. 3 is a perspective view of a folded linkage drive assembly.

Referring now to FIG. 3, torque rod 54 is preferably a convoluted or reverse-bend torque rod. Torque rod 54 comprises a first end 58, a second end 60, and a convoluted portion 62 extending therebetween. Convoluted portion 62 includes elongate straight and generally parallel legs 64, 66, 68, and 70. A U-shaped bight portion 72 connects legs 64 and 66 and a U-shaped bight portion 74 connects legs 68 and 70. Similarly, a U-shaped bight portion 76 connects legs 66 and 70 underneath box 50.

The energy storing capability of torque rod 54 is of the same magnitude as conventional torque rods. The advantage of using torque rod 54 with convoluted portion 62 is that the torque rod can be housed within the space defined by quarter panel 22 while still providing enough torque to power link assembly 32. Furthermore, the energy storing capability of torque rod 54 may be increased by increasing the number of legs and bight portions.

Box 50 anchors first end 58 and holds it stationary when torque rod 54 winds and unwinds. Second end 60 is inserted into a slot or socket 76 of lower link 36 to anchor the second end in the lower link. When deck lid 18 is closed, link assembly 32 folds and lower link 36 causes second end 60 to move toward first end 58. This, in turn, causes convoluted portion 62 to twist in torsion storing energy. Convoluted portion 62 is not free to rotate as first end 58 is anchored by box 50. When deck lid 18 is opened, convoluted portion 62 untwists releasing energy as second end 60 moves away from first end 58. Second end 60 uses the released energy to force link assembly 32 to unfold and assist the movement of deck lid 18 to the opened position. It will be understood that when the torque rod, box and links are assembled, the torque rod is stressed sufficiently when the links are in the unfolded position that the deck lid will be held open by this "residual" tension in the torque rod. Thus, when the deck lid is opened and the links unfold, there is a residual stress or tension in the torque rod sufficient to hold the lid open.

In this preferred embodiment, lower link 36 pivots directly on box 50 and first end 58 of torque rod 54 is anchored directly to box 50. In a variation of the preferred embodiment, lower link 36 is not connected to box 50 and instead pivots directly on second end 60.

In another embodiment without box 50, first end 58 is anchored directly to vehicle 12. Lower link 36, in addition to being connected to second end 60, is pivotally connected to vehicle 12 to pivot directly on vehicle 12. Of course, lower link 36 may be connected only to second end 60 which provides the pivoting function for the lower link.

Referring now to FIG. 4, another perspective view of link assembly 32 is shown. FIG. 4 shows the pivotal connection 48 between links 36 and 38 and the pivotal connection 52 between link 36 and box 50.

Link assembly 32 is shown without box 50 in FIG. 5 to illustrate the connection between second end 60 and lower link 36. Specifically, second end 60 is inserted into a slot 76 of lower link 36.

FIG. 6 shows link assembly 32 unfolded and illustrates the ball joint 40 and bracket 42 used to attach upper link 38 to deck lid 18. Also, first end 58 is anchored to box 50 in a retaining notch 78. Box 50 may have a set of retaining notches and by varying which of notches secure first end 58, the amount of bias provided to open deck lid 18 can be adjusted.

It should be noted that the present invention may be used in a wide variety of different constructions encompassing many alternatives which are apparent to those with ordinary skill in the art. Accordingly, the present invention is intended to embrace all such alternatives, modifications, and variations as fall within the spirit and broad scope of the appended claims.

What is claimed is:

1. A linkage drive for the deck lid of a vehicle comprising, in combination;

a deck lid for pivotal attachment to the vehicle;

a lower link;

an upper link attached at one end to the deck lid and pivotally connected at the other end to the lower link, wherein the upper link has a ball joint openable with a bracket for attachment to the deck lid;

a torque rod having a first end, a second end, and a convoluted portion extending therebetween, the convoluted portion including at least two generally parallel legs and at least one U-shaped bight portion connected therebetween;

a hinge box for mounting to a side of the vehicle, wherein the lower link is pivotally connected to the hinge box;

said first end anchored to the hinge box and the second end anchored to the lower link; and said torque rod being tensioned and the links folded as the deck lid is closed and unwinding under the stored tension and the legs unfolded when the deck lid is opened to support the deck lid in the opened position.

2. The linkage drive of claim 1 wherein the box has a bumper engageable with the lower link to limit movement of the lower link.

3. The linkage drive of claim 2 wherein the bumper is made of a rubber.

4. The linkage drive of claim 1 wherein the box is a metal stamping.

5. The linkage drive of claim 1 wherein the lower link and the upper link are pivotally connected by a riveted joint.

6. The linkage drive of claim 1 wherein the lower link has a slot, wherein the second end of the torque rod is inserted within the slot.

7. The linkage drive of claim 1 further comprising:

a second lower link;

a second upper link attached at one end to the opposite side of the deck lid from the first mentioned upper link and pivotally connected at the other end to the second lower link; and a second torque rod having a first end, a second end, and a convoluted portion extending therebetween, the convoluted portion including at least two generally parallel legs and at least one U-shaped bight portion connected therebetween, the first end anchored to the vehicle at the opposite side thereof from the first mentioned torque rod and the second end connected to the second lower link whereby the torque rod is tensioned and the links fold when the deck lid is closed and unfold under the unwinding tension when the deck lid is opened to support the deck lid in the opened position.

8. A linkage drive assembly for assisting in opening a deck lid pivotally attached to a vehicle body and supporting the deck lid in an opened position, the assembly comprising:

a lower link having upper and lower ends;

an upper link having upper and lower ends and adapted for attachment at the upper end to the deck lid and pivotally connected at the lower end to the upper end of the lower link, wherein the upper link has a ball joint for attachment to the deck lid;

a hinge box for mounting to a side of the vehicle adjacent an opening of the deck lid, wherein the lower end of the lower link is pivotally connected to the hinge box; and a reverse-bend torque rod having a first end and a second end, the first end anchored to the hinge box and the second end connected to the lower and of the lower link whereby the torque rod is tensioned and the links fold when the deck lid is closed and unfold under the unwinding tension in the torque rod when the deck lid is opened to support the deck lid in the opened position.

9. The assembly of claim 8 wherein the box has a bumper engageable with the lower link to limit movement of the lower link.

10. The assembly of claim 8 wherein the reverse-bend torque rod has a convoluted portion extending between the first and second ends, the convoluted portion including at least two generally parallel legs and at least one U-shaped bight portion connected therebetween.

11. A linkage drive assembly for a deck lid or hood, the assembly comprising:

a box for attachment to a vehicle quarter panel;

a torque rod having a first end, a second end, and a convoluted portion extending therebetween, the convoluted portion including at least two generally parallel legs and at least one U-shaped bight portion connected therebetween, the first end anchored to the box;

a lower link having a lower portion connected to the second end of the torque rod and an upper portion, wherein the lower portion of the lower link is pivotally connected to the box; and an upper link having a lower portion pivotally connected to the upper portion of the lower link and an upper portion for attachment to the deck lid or hood, wherein the upper portion of the upper link has a ball joint for attachment to the deck lid or hood.

12. The assembly of claim 11 wherein the convoluted portion of the torque rod is adapted to be disposed within space defined by the vehicle quarter panel.

13. The assembly of claim 11 wherein the box has a bumper engageable with the lower link to limit movement of the lower link.

* * * * *